United States Patent Office 3,737,412
Patented June 5, 1973

3,737,412
METHYLOLATED OLEFIN-MALEIMIDE COPOLYMERS AND METHOD FOR PREPARING
Bernard S. Wildi, Kirkwood, Mo., assignor to Monsanto Company, St. Louis, Mo.
No Drawing. Original application Mar. 24, 1969, Ser. No. 809,993. Divided and this application Sept. 7, 1971, Ser. No. 178,510
Int. Cl. C08g 9/24
U.S. Cl. 260—67.5          3 Claims

ABSTRACT OF THE DISCLOSURE

N-hydroxymethyl- and/or N-halomethyl olefin-maleimide copolymers as new compositions of matter; the process of preparing said N-hydroxymethyl copolymers from olefin-maleimide copolymers and formaldehyde; and the process of preparing said halomethyl copolymers from said hydroxymethyl copolymers and a halogenating agent. The new compositions of matter are useful as resinous substrates in biopolymer synthesis.

---

This application is a divisional application of Ser. No. 809,993, filed Mar. 24, 1969, and now abandoned.

BACKGROUND OF THE INVENTION

Field of the invention

This invention relates to N-hydroxymethyl olefin-maleimide copolymers and to N-halomethyl olefin-maleimide copolymers. In a particular aspect this invention relates to a process for preparing said N-hydroxymethyl copolymers. As a further aspect this invention relates to a process for preparing said N-halomethyl copolymers. In a still further aspect this invention relates to the use of said copolymers in biopolymer synthesis, for example, peptides and nucleotides.

Description of the prior art

Resinous polymers are known to be useful as substrate in biopolymer synthesis; for solid-phase peptide synthesis, see, e.g., R. B. Merrifield, J. Amer. Chem. Soc., 85 2149 (1963) and Biochem., 3 1385 (1964), and G. R. Marshall and R. B. Merrifield, Biochem., 4 2394 (1965); for similar solid phase synthesis of polynucleotides see G. M. Blackburn, M. J. Brown and M. R. Harris, Chemical Communications (1966) No. 17,611.

In the case of the Merrifield peptide synthesis method a C-terminal amino acid having the a-amino group blocked is attached to an insoluble resin, the blocking is removed, and the residual insoluble complex is reacted with the same or different N-blocked C-terminal amino acid to form a product in which a dipeptide having the terminal amino group blocked is attached to the resin. Removal of the blocking from said product permits its use for subsequent reaction with the same or different N-blocked C-terminal amino acid. Unblocking of the resulting reaction product, and use of the unblocked product in subsequent reaction with an N-blocked amino acid can occur any number of times, so that a peptide chain of amino acids can be built up on the resin to any desired length and with any desired sequence of amino acid units. After each blocked amino acid has been added, selective unblocking must be conducted without cleavage of the peptide chain from the resinous substrate, unless, of course, the last desired unit of the chain has been added. After the peptide chain has been built up to the desired length, stripping of said chain from the resin carrier should not involve any disruption of the chain structure. For these and other considerations of a practical nature, much effort has been expended in attempting to find or devise a carrier resin which will permit the required manipulations. In accordance with the present invention it has been found that N-hydroxymethyl- or N-halomethyl-substituted olefin-maleimide copolymers successfully serve as carrier resins in biopolymer synthesis.

Both the hydroxymethyl- and the halomethyl-substituted copolymers are also valuable as starting materials for the production of a variety of derivatives (through acylation, halogen-replacement or chelation). The N-hydroxymethyl substituted copolymers are useful as sequestering agents. The N-halomethyl substituted copolymers are useful as molding and coating resins.

SUMMARY OF THE INVENTION

This invention provides a new and valuable class of resinous copolymers having the repeating unit

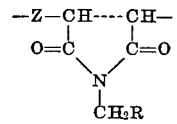

wherein 2 is a bivalent hydrocarbon radical, for example alkylene, alkylaryl substituted alkylene, arylsubstituted alkylene, and alkoxyalkylene having for example, 1 to 12–18 carbon atoms and R is a hydroxyl radical or a halogen radical, for example, chloro, fluoro, iodo and bromo.

The invention further provides a method of preparing the above copolymers, by reacting a copolymer of the formula (I)     

wherein Z is defined as above with formaldehyde to obtain a polymer consisting essentially of the repeating unit (II)    

Treatment of (II) with a halogen-containing compound that is capable of replacing the hydroxy group with halogen converts at least a portion of the above units to units in which the hydroxyl radical is replaced by halogen, i.e. to (III)   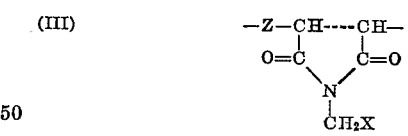

wherein X is halogen, i.e., chlorine, bromine, iodine or fluorine. The extent of conversion of the N-hydroxymethyl units to the halomethyl units will depend upon the number of active functionalities desired, which can be controlled among other things, by the quantity of halogenating agent employed and the reaction conditions. For many purposes, and particularly in biological applications, copolymers consisting of both the unit (II) and the unit (III) are desired. For example, retention of some hydroxymethyl in the halogenation product provides for some solubilizing and surfactant effect in copolymers during the initial attachment wherein the halogen of unit (III) has been replaced by an amino acid or peptice residue. Subsequent to initial attachment, excess functional groups are blocked (e.g. by acylation with acetic anhydride). However, copolymers consisting of substantially only the hydroxymethyl-containing units (II) or of only the halomethyl-containing units (III) are provided by this invention, the utility thereof depending upon the properties desired of either the copolymers per se or of derivatives prepared therefrom.

The invention additionally provides for the method of preparing biopolymers, for example, peptides and nucleotides which comprises contacting a copolymer containing the units (II) and/or the units (III) with an N-blocked a-amino carboxylic acid to obtain a new and valuable copolymer intermediates having the repeating units (IV)

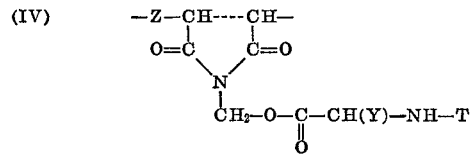

wherein Z is defined as above, Y is a hydrocarbon or hydrogen residue of the amino acid employed in the reaction containing, for example, 1-7 carbon atoms and T is a hydrocarbon radical (e.g. acyl, alkyl, sulfenyl or aryl sulfenyl) containing, for example, 1-12 carbon atoms, which is an amine blocking group.

Upon removing the blocking radical T from the units (IV), the residual copolymer intermediate reacts readily, through the terminal amino group, with fresh N-blocked a-amino carboxylic acid using conventional coupling agents (e.g. carbodiimides or carbodiimidazoles) to form a product in which an N-blocked dipeptide is linked to the resin through an ester group. Repeated unblocking and reaction of the unblocked product with fresh blocked amino acid utilizing coupling agents gives a product in which a peptide chain of desired length or of selected amino acid sequence is built up while remaining attached to the polymer. The combination of carrier polymer and peptide may thus be depicted by the formula (V)

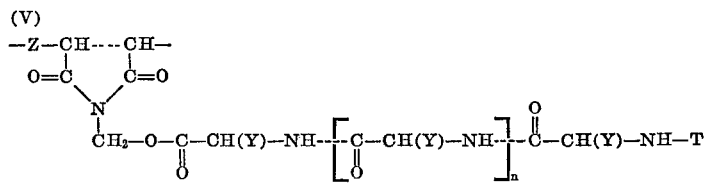

wherein $n$ is a number of from, for example, zero to 100.

DESCRIPTION OF THE PREFERRED EMBODIMENTS

The starting resin is preferably the copolymer of isobutylene, ethylene or styrene with maleic anhydride; however, it may be the copolymer of maleic anhydride and an aliphatic hydrocarbon olefin such as propylene, 1-hexene, 1-octene, dodecene, 1-decene, 2-butene, 2-methyl - 2 - butene, 1-butene, 2,3-dimethyl - 1 - butene, hexadecene, 2-ethyl-1-butene, etc., or of an aryl- or aralkyl-substituted olefin such as, o- or p-methylstyrene, -methyl-styrene, p-ethylstyrene, vinyl toluene $\alpha,p$-dimethyl-styrene, etc. The copolymer will generally contain substantially equimolar quantities of the olefin moiety and the maleic anhydride moiety; and it will have a degree of polymerization which will vary from, for example, 100 to 10,000. As is known in the art, the molecular weight of the hydrocarbon olefin-maleic anhydride copolymers may be regulated by proper choice of catalyst (usually peroxidic) and of one or more of the other variables such as the nature of the olefin reactant, temperature, and catalyst concentration and the incorporation of any of several known chain-transfer agents (e.g., diisopropyl-benzene, propionic acid, alkylaldehydes, etc.). For the present purpose, copolymers of a wide range of solubility characteristics may be used, the nature of the starting polymer being governed by the properties desired in the final product. When markedly insoluble products are the objective, it is often advantageous to employ copolymers which contain some crosslinking. Such crosslinked copolymers are known to be obtainable by conducting the copolymerization of maleic anhydride and hydrocarbon olefin in the presence of a crosslinking agent; e.g., a compound containing two olefinic double bonds, such as divinylbenzene or vinylcrotonate, poly 1, 2-butadiene, a-ω diolefins. The quantity of crosslinking agent will vary with the degree of insolubility desired; generally, it will be in the order of from about 0.1% to about 10% by weight of the total monomer mixture. As will be hereinafter shown, the present products are of particular utility as polymeric carriers in peptide synthesis. In addition to the above mentioned pre-crosslinking it may also be crosslinked by concurrent treatment with diamine compounds (e.g. hexamethylene diamine) during the amide and/or imide-forming steps. Using crosslinked products, one has added freedom in selecting the solvents to be employed in the peptide synthesis for which the present N-hydroxymethyl-substituted and/or halomethyl-substituted copolymers are particularly designed.

The starting polymers are generally prepared by reaction of an olefin-maleic anhydride copolymer with ammonia, employing conditions wherein cyclization of any intermediate amide and/or ammonium salt is facilitated for production of the imide structure. The solubility properties of the olefin-maleic anhydride copolymers and of the olefin-maleimide copolymers prepared therefrom will vary with the nature of the olefin and with the degree of polymerization.

Reaction of the olefin-maleimide copolymer with formaldehyde to give the N-hydroxymethylated copolymer proceeds readily, in the presence of absence of an inert liquid diluent or solvent at ordinary or increased temperatures. Conveniently, reaction is conducted with an aqueous solution of formaldehyde and the reaction mixture is warmed at from about 25° C. and preferably about 50° C. to the refluxing temperature. However, the addition reaction may also be conducted by passing gaseous formaldehyde into a solution of the olefin-male-imide copolymer or by using trioxymethylene or paraformaldehyde or hexamethylenetetramine as the formaldehyde source. For economic reasons, it is advantageous to work with a commercially or otherwise readily available aqueous formaldehyde such as an aqueous solution, having a formaldehyde concentration of in the range of 30 to 40%. The N-hydroxymethylated product is generally insoluble in polar liquids; hence it is easily separated from the reaction mixture by precipitation using a non-solvent such as a lower alcohol or dimethyl sulfoxide.

The N-hydroxymethylation proceeds substantially according to the addition reaction

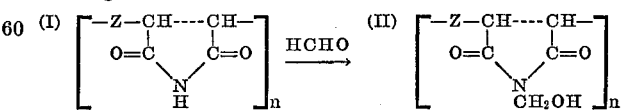

wherein Z is as above defined and $n$ denotes the degree of polymerization. Purification or isolation of the hydroxymethylated copolymer from any by-product is not required. Use of the polyimide and the formaldehyde in substantially stoichiometric proportions, i.e., one mole of the aldehyde per unit of the polymer results in substantially complete hydroxymethylation; however, to assure maximum reaction within minimum time, it is advantageous to employ an excess of the formaldehyde.

Conversion of the N-hydroxymethyl-substituted copolymer to the N-halomethyl-substituted product takes place by reaction of the hydroxy-containing copolymer with an agent which is capable of replacing the alcoholic hydroxylic group with halogen by a double decomposition reaction, e.g., a hydrogen halide such as hydrogen bromide, a phosphorous trihalide such as phosphorus trichloride, a thionyl halide such as thionyl chloride, bromide, fluoride or iodide, etc. The thionyl halides are preferred. Generally, contact of the hydroxymethyl-containing copolymer with the thionyl halide at temperatures in the range of from about 50° C. to reflux temperature will result in replacement of the hydroxy radical by the halogen of the halide reactant, warming or refluxing being continued, with stirring, until the desired extent of replacement has been obtained. As hereinbefore disclosed, for some purposes, it may be desired to convert only a portion of the hydroxymethyl radicals of the copolymer into halomethyl groups. In this case, progress of the reaction is followed, e.g., by removing samples of the reaction mixture to ascertain the halogen and/or hydroxy content, and heating is discontinued when the extent of halogen substitution is that which is desired.

The present N-hydroxymethyl and/or N-halomethyl-substituted olefin-maleimide copolymers are employed as follows in peptide synthesis:

A resinous ester is prepared by reacting one of the described copolymer products i.e., that having only N-hydroxymethyl units, or only N-halomethyl units, or both N-hydroxymethyl and N-halomethyl units, with an N-blocked a-amino carboxylic acid. The N-halomethyl radical reacts with N-blocked -amino carboxylic acid with base catalysis (e.g. tetiaryamines) whereas the N-hydroxymethyl radical requires activation for coupling (e.g. using coupling agents such as carbodiimides or diimidazoles). Reaction occurs very readily as follows:

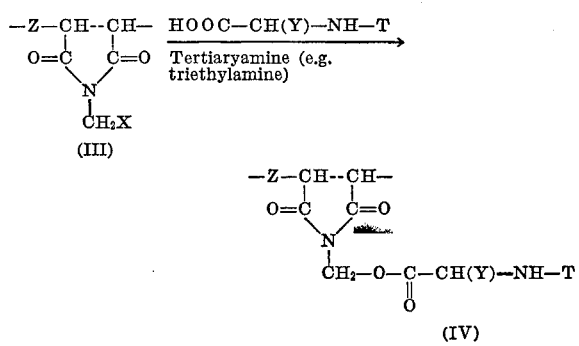

When it is desired to prepare polymeric products having some units of the type (IV) and some N-hydroxymethyl units (for solvolytic effect), the copolymer which is used for reacting with the N-blocked amino carboxylic acid will have some N-halomethyl units (III) and some N-hydroxymethyl units (II). The halomethyl units are reacted preferentially to the hydroxymethyl units using tertiaryamine catalysis and refluxing conditions. A copolymer having both the ester units (IV) and the hydroxymethyl units (II) is useful as a sequestering agent or in other applications where a plurality of aliphatic hydroxyl radicals and amide-ester groups contribute to desired solvolytic effect. The carbodiimides which are known to possess the property of catalyzing reactions involving the carboxyl radical, e.g., dicyclohexylcarbodiimide or Sheehan's reagent (1-cyclohexyl-3-(2-morpholinoethyl)-carbodiimide metho-p-toluenesulfonate) are useful in reacting the N-blocked amino acid with the N-hydroxymethyl units (II).

Selection of the blocking group T in the copolymer units (IV) is dictated by its ease of removal relative to splitting the linkage binding the amino acid residue to the resin. Generally, there should be used a blocking group which can be removed upon mild treatment. That is because the ester linkage between the polymer backbone and amino acid or peptide moiety is subject to some cleavage with excesses of strong inorganic acids and unblocking should be conducted to avoid cleavage at the ester linkage. For the present purposes, the N-blocking is preferably effected with the o-nitrophenylsulfenyl group which is readily removed with stoichiometric amounts of inorganic acid or via attach with various nucleophilic agents (e.g. thiourea) or hydrogenation. However, it can be selected from numerous available acyl radicals of such organic acids as the carboxylic, sulfonic, sulfinic, phosphonic and phosphinic acids, so long as the blocking group can be removed without affecting the ester linkage to the carrier polymer. The peptide synthesis is then carried out as previously described until the desired peptide is synthesized.

When a peptide chain of desired length has been built up on the polymer, the product is treated to obtain cleavage of the chain from the carrier polymer. This is readily attained by treatment with a strong, hydrolyzing agent, preferably with a strong inorganic acid in anhydrous solvent. Conditions for cleavage will generally be more stringent than those used for unblocking of the terminal amino radical; hence, when cleavage is desired, unblocking of the terminal nitrogen and cleavage can be brought about to occur simultaneously. However, a stepwise procedure may be used; i.e., the final blocked product may be treated with a mild acid for removal of the N-blocking group, and the residue may then be subjected to more stringent acidic or basic agents to bring about cleavage of the peptide moiety from the polymeric carrier. Since cleavage will be the result of ester hydrolysis, the residual polymeric product will be the N-hydroxymethyl-substituted hydrocarbon olefin-maleimide copolymer consisting essentially of the units (II). The copolymer from which the peptide chain has been stripped may be returned to the process. For example, it may be submitted to halogenation for conversion of at least some of the hydroxymethyl groups to halomethyl groups, or the hydroxymethyl groups may be esterified directly with an N-blocked a-amino carboxylic acid.

A useful alternate procedure for removing the peptide from the resin involves transesterification or more specifically, alcoholysis. Here the resin-peptide product is exposed to large excesses of alcohol (e.g. methyl alcohol) in the presence of basic catalyst such as triethylamine. The resultant peptide is obtained as the C-terminal methyl ester and the hydroxymethyl group of the resin is reformed. Alternately hydrazine or N,N-dimethylhydrazine can be used to remove the peptide forming the respective C-terminal hydrazides.

The invention is further illustrated by, but not limited to, the following examples.

EXAMPLE 1

A 1:1 molar ratio isobutylene-maleic anhydride copolymer was heated in a stirred flask to 175–180° C. under a constant stream of ammonia. Water evolution began at about 140° C. The reaction continued for 6 hours, yielding the water-soluble ammonium salt of the desired imide. Treatment of this salt in a vacuum oven at 110° C. for five days yielded the isobutylene-maleimide copolymer (I-A)
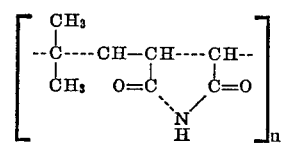

where $n$ denotes the degree of polymerization. The copolymer (I-A) analyzed 9.10% nitrogen as against 9.15%, the theoretical value, and was characterized by a pair of infrared absorption peaks at 5.6μ and 5.9μ and the absence of peaks for anhydride, carboxyl and carboxamide.

Copolymer (I-A) was converted as follows to the N-hydroxymethyl derivative. A mixture consisting of 15.0 g. of said copolymer, 78 ml. of 37% aqueous formaldehyde and 20 ml. of water was heated to 80° C. for 30 minutes with vigorous stirring. The temperature was reduced to room temperature and the precipitate filtered and washed thoroughly with absolute ethanol and dried overnight at 5.0 mm. over concentrated sulfuric acid to yield 15 g. of solid polymer consisting essentially of the repeating unit (II-A)

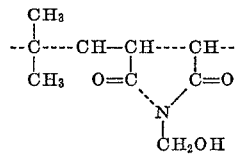

and analyzing as follows:

Calcd. for $C_9H_{13}NO_3$ (percent): C, 59.00; H, 7.10; N, 7.60. Found (percent): C, 58.16; H, 6.35; N, 7.14.

EXAMPLE 2

A mixture consisting of 14.8 g. of the isobutylene-N-hydroxymethyl maleimide copolymer (II-A) of Example 1 and 150 ml. of freshly purified thionyl chloride was heated to reflux (78° C.), slowly and with vigorous stirring. The mixture was refluxed for 45 minutes, cooled to room temperature and filtered. The precipitate was collected and washed four times with benzene in the centrifuge, and then dried overnight at 5.0 mm. in a vacuum desiccator to yield 14.8 g. of product, which analyzed 5.00% chlorine. Based on elemental analysis, the product has one N-chloromethyl unit:

(III-A)

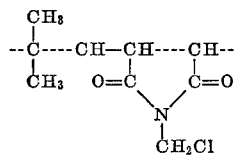

per 2.77 N-hydroxymethyl units:

(II-A)

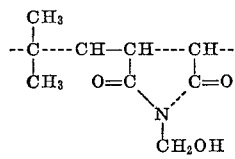

Elemental analysis gave the following values: Calcd. for 1:2.77 III-A: II-A units (percent): C, 57.59; H, 6.78; N, 7.45; Cl, 5.00. Found (percent): C, 58.01; H, 6.83; N, 7.48; Cl, 5.00.

The chlorine content of the present polymeric product is thus 1.4 mmole per gram which is a useful range of functionality for peptide synthesis.

EXAMPLE 3

(A) A mixture consisting of 3.0 g. of the chloromethylated polymer of Example 2, 7.0 g. of N-acetylglycine, 0.16 g. of dry triethylamine and 30 ml. of dry dimethyl sulfoxide was stirred at room temperature of 18 hours. The temperature was raised to 80° C. and held constant for 4 hours. The mixture was cooled, allowed to stand at room temperature for 23 hours, and then filtered. The solid was washed with methanol 3 times, with water once, then again 3 times with methanol and finally dried under vacuum overnight to obtain a polymeric product in which substantially all of the chloromethyl groups of the chloromethylated polymer of Example II had reacted with the N-acetylglycine. Based on the chlorine and nitrogen analysis, the product has one acetylglycyl unit:

(IV-A)

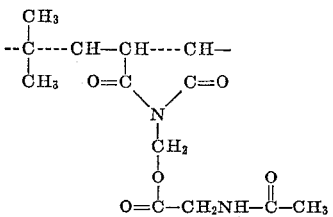

per 2.77 of the N-hydroxymethyl units (II-A) shown in Example 2.

Elemental analysis gave the following values: Calcd. for 1:2.77 IV-A: II-A units (percent): N, 8.43; Cl, 0.00. Found (percent): N, 8.40; Cl, 0.04.

(B) The facile cleavage of this resin-amino acid bond under controlled conditions having minimal effect on normal peptide bond linkages is demonstrated as follows:

One gram of the esterified N-acetyl glycine resin prepared in A was treated for 2 hours with 20 ml. of 1 N HCl in glacial acetic acid. Under these anhydrous conditions, the ester bond attaching the amino acid derivative to the resin was readily cleaved essentially quantitatively. The product, pure N-acetyl glycine, was identified after recrystallization by its melting point and mixed melting point compared to a known sample (M.P. 206° C.).

EXAMPLE 4

A mixture consisting of 0.1 g. of the chloromethylated polymer of Example 2, 0.41 g. (3-fold excess) of trifluoroacetate t-butyloxycarboxyl lysine (TFA·BOC lysine). 0.25 g. dicyclohexylcarbodiimide and 5 ml. of methylene chloride were reacted with stirring for 36 hours at room temperature. The product was isolated by filtration, washed several times each with methylene chloride, ethanol and again with methylene chloride. A yield of 0.12 g. was obtained after air drying. The product had a fluorine content of 5.51%. This represents 0.33 g. or 0.96 mole of TFA·BOC·Lysine per gram of product.

A 5.3 mg. sample of this polymer product was treated with anhydrous hydrogen fluoride, an agent commonly used in stripping peptide from carrier polymers, at room temperature. Amino-acid analysis of the treated sample indicated no liberation of lysine showing that the attachment is stable to this treatment.

EXAMPLE 5

This example describes the coupling of o-nitrophenylsulfenyl leucine dicyclohexaglamine salt (NES·LEU·DCHA)

to the polymeric resin of Example 2.

A mixture consisting of 0.50 g. of the chloromethylated polymer of Example 2, NPS·LEU·DCHA (converted to the free blocked amino-acid), 0.07 g. of triethylamine and 10 ml. of absolute alcohol were reacted with stirring at 80° C. overnight. The product was isolated by filtration, washed several times with absolute alcohol and dried. Yield of product was 0.52 g.

EXAMPLE 6

(A) The hydroxy radicals of the 1.0:2.77 ratio N-chloromethyl-containing: N-hydroxymethyl-containing copolymer of Example 2 are converted to acetoxy groups by boiling with acetic anhydride. The resulting copolymer is then added to a dimethyl sulfoxide solution of N-(o-nitrophenylsulfenyl)-alanine (NPS·ALA) in presence of triethylamine as hydrogen chloride scavenger the reaction being conducted at 80° C. There is thus obtained a copolymer having one N-(o-nitrophenylsulfenyl)alanyl ester unit (IV–B)

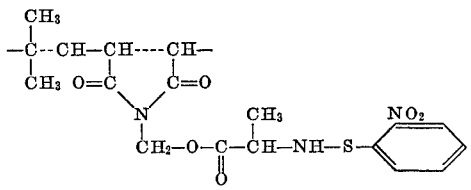

per about 2.7 of the acetoxy-substituted units:

(IV–C)

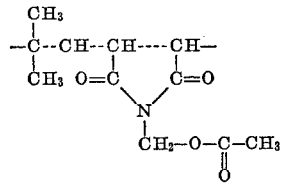

Treatment of the copolymer with dilute hydrochloric acid (ca. 0.01 N) removes the NPS group from the units (IV–B) to give a copolymer in which said units (IV–B) have been converted into the unblocked units:

(V–A)

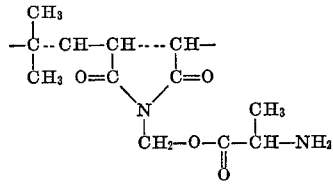

Reaction of the resulting copolymer with a 10% excess of NPS glycine in dimethyl acetamide solution using an equimolar amount of dicyclohexylcarbodiimide as coupling agent converted the units (V–A) of the copolymer into the dipeptide-containing units:

(VI-A)

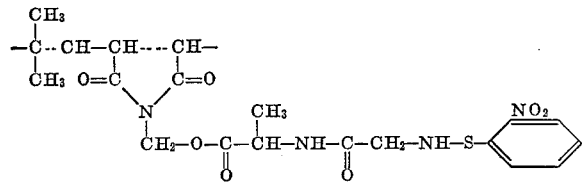

(B) Treatment of a portion of the product (VI–A) with 1 N HCl in glacial acetic acid as described in Example 3 resulted in the simultaneous removal of the NPS α-amino blocking group and the essentially quantitative stripping of the dipeptide glycine-alanine from the carrier resin.

(C) A second portion of the product VI-A is treated with 1.0 M aqueous piperidine using a 5% slurry by weight. After stirring for 30 hours, the insoluble resin is removed from the mixture by filtration and the product NPS·Glycine-alanine, is recovered substantially quantatively by lyophilization of the aqueous solution.

EXAMPLE 7

(A) A dimethylformamide solution of N-hydroxymethyl-substituted isobutylene-maleimide copolymer (II–A of Example 2) is mixed with p-diphenylisopropyloxycarbonylglycine (DPOC-glycine) in a quantity sufficient to acylate the hydroxyl groups of said copolymer. The above-described Sheehan's reagent is added in equimolar amount to the resulting mixture for activation of the carboxy group. After stirring overnight at room temperature, the originally clear solution shows separation of by-product urea. After a 20 hr. reaction time, filtration of the resulting reaction mixture and precipitation of the filtrate from absolute ethanol yields the substantially pure BOC-glycyl ester of N-hydroxymethyl-substituted isobutylene-maleimide copolymer, consisting essentially of the repeating unit:

(VII-A)

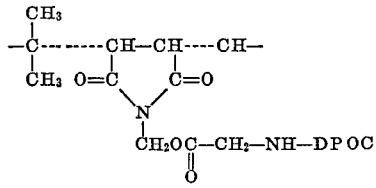

(B) Treatment of the product of A with 80% acetic acid quantatively removes the DPOC blocking group in about 6 hours. These very mild conditions do not affect the ester-bond attachment to the carrier polymer. The peptide chain is then lengthened by coupling with DPOC–Alanine in the manner described in Example 6. Stripping the dipeptide from the carrier resin is accomplished as in Example 6, the DPOC group being concurrently removed.

It is to be understood that although the invention has been described with specific reference to particular embodiments thereof, it is not to be so limited, since change and alterations therein may be made which are within the full intended scope of this invention as defined by the appended claims.

What I claim is:

1. A resinous copolymer having the repeating unit:

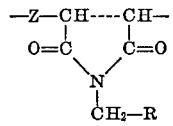

wherein Z is a bivalent hydrocarbon radical and R is a hydroxy group.

2. The process for the preparation of a resinous copolymer consisting essentially of the repeating unit:

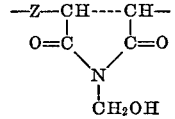

comprising treating with formaldehyde a resinous copolymer consisting essentially of the repeating unit:

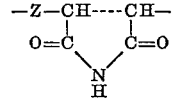

wherein Z is a bivalent radical.

3. The process of claim 2 in which Z is isobutylene.

References Cited

UNITED STATES PATENTS

| | | | |
|---|---|---|---|
| 2,146,209 | 2/1939 | Graves | 260—2 |
| 2,381,020 | 8/1945 | Wilkes | 8—142.5 |
| 2,971,939 | 2/1961 | Baer | 260—32.8R X |
| 3,231,533 | 1/1966 | Garrett et al. | 260—72R X |
| 3,296,209 | 1/1967 | Mark | 260—67.5 |
| 3,317,476 | 5/1967 | Sellet | 260—72 R |
| 3,422,074 | 1/1969 | Ishida et al. | 260—67.5 |
| 3,429,947 | 2/1969 | Eygen et al. | 260—836 |

OTHER REFERENCES

Chem. Abstracts, Vol. 63, 1965, 8496g.

Journal of Polymer Science, Vol. 40, 1959, pp. 227–231, Goethals et al.

HOWARD E. SCHAIN, Primary Examiner

U.S. Cl. X.R.

260—8.78 A, 112.5

PO-1050
(5/69)

UNITED STATES PATENT OFFICE
CERTIFICATE OF CORRECTION

Patent No. 3,737,412                    Dated June 5, 1972

Inventor(s) Bernard S. Wildi

It is certified that error appears in the above-identified patent and that said Letters Patent are hereby corrected as shown below:

Column 2, line 20, "2", should read ---Z---.

Column 2, line 65, "peptice", should read ---peptide---.

Column 5, line 30, "tetiaryamines", should read ---tertiaryamines---

Column 8, line 55, "(NPP-LEU-DCHA)", should read ---(NPS-LEU-DCHA)---

Signed and sealed this 27th day of November 1973.

(SEAL)
Attest:

EDWARD M. FLETCHER, JR.                 RENE D. TEGTMEYER
Attesting Officer                       Acting Commissioner of Patents